(12) United States Patent
Bianca, Jr. et al.

(10) Patent No.: US 8,632,036 B1
(45) Date of Patent: Jan. 21, 2014

(54) INTEGRATED ARTICULATING THERMAL ISOLATION SYSTEM AND METHOD

(75) Inventors: Daniel M. Bianca, Jr., Los Angeles, CA (US); Valeda B. Scribner, Boulder, CO (US); John Jay Hartlage, Thousand Oaks, CA (US); Howen Mak, El Segundo, CA (US); Sung H. Kang, Chino Hills, CA (US); Teofilo R. El Masri, Alhambra, CA (US); Sara Ly, Stanton, CA (US); Thomas Rust, III, Manhattan Beach, CA (US); Brian K. Smith, Redondo Beach, CA (US); Arthur R. Zapf, San Gabriel, CA (US); Jesse C. Villegas, Los Angeles, CA (US); Rachid Nedjar, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 714 days.

(21) Appl. No.: 12/938,362

(22) Filed: Nov. 2, 2010

(51) Int. Cl.
*B64G 1/36* (2006.01)

(52) U.S. Cl.
USPC ......... 244/171.7; 244/171.8; 428/57; 428/68; 428/920

(58) Field of Classification Search
USPC .................. 244/171.7, 171.8; 428/57, 68, 920
See application file for complete search history.

(56) References Cited

U.S. PATENT DOCUMENTS

| | | | | |
|---|---|---|---|---|
| 5,080,306 A | * | 1/1992 | Porter et al. ............... | 244/171.7 |
| 5,161,756 A | * | 11/1992 | Redmon, Jr. et al. ...... | 244/171.7 |
| 5,598,989 A | * | 2/1997 | Ross et al. ................ | 244/171.7 |
| 5,997,973 A | | 12/1999 | Bianca, Jr. | |
| 6,007,026 A | * | 12/1999 | Shorey ....................... | 244/171.8 |
| 7,673,833 B2 | * | 3/2010 | Lundgren et al. .......... | 244/171.7 |

* cited by examiner

*Primary Examiner* — J. Woodow Eldred

(57) ABSTRACT

There is provided an integrated articulating thermal isolation system having an articulating actuator assembly, a support frame assembly, and a thermal blanket assembly. The thermal blanket assembly has a pair of non-articulating blankets positioned on exterior surfaces of the support frame assembly and a pair of articulating blankets disposed between the non-articulating blankets. Each articulating blanket has a plurality of stiffener elements. The system further has a harness assembly, a deployable assembly interface element, and a vehicle interface element. When the articulating actuator assembly is actuated, the articulating blankets are guided by the support frame assembly from a stowed position to a deployed position through motion of the articulating actuator assembly.

20 Claims, 15 Drawing Sheets

INTEGRATED ARTICULATING THERMAL ISOLATION SYSTEM AND METHOD

CROSS-REFERENCE TO RELATED APPLICATIONS (Not Applicable)

STATEMENT RE: FEDERALLY SPONSORED RESEARCH/DEVELOPMENT (Not Applicable)

FIELD

The disclosure relates generally to systems and methods for thermal barriers, and more particularly, to systems and methods for thermal blankets and harnesses enclosing actuator assemblies.

BACKGROUND

Thermal barriers are typically used by many space-based systems to protect such systems from temperature extremes resulting from variable insolation. Whether the space-based system is a space vehicle, such as a satellite with a relatively long-term orbit or a launch and recover spacecraft, vital components must be protected from the strain created by variable insolation. For example, a satellite with one side exposed to direct sunlight and the other side completely in shadow would be subjected to extreme mechanical stresses due to the sharp temperature differences between the exposed and shadowed sides. Known thermal barriers or blankets are typically employed to moderate these temperature differences. In applications in which the thermal blankets are used to enclose a moving mechanical assembly, such as an articulating actuator assembly and its nearby surrounding equipment, structure, and hardware, care must be taken during assembly of the satellite to ensure that the thermal blanket does not interfere with the movement of the moving mechanical assembly. This can be the case when other hardware such as harness and cable assemblies, launch locks, or other equipment need to operate and/or move as part of the moving mechanical assembly. Moving mechanical assemblies typically include all components surrounding a moving mechanism that operate and/or move with the mechanism for the system to meet its function. These components can include non-rigid structures such as cabling and blankets, as well as other assemblies such as launch locks and other equipment.

Consequently, known thermal blankets are typically made substantially larger than the enclosed moving mechanical assembly and then hand-fitted during assembly. Such blankets are typically not supported with substantial structure, and the designs typically rely on the features built into the blankets, such as seams and linings, to hold the blankets' shape and to perform the blankets' function. Technicians must carefully enclose the movable mechanical assembly to be protected by the thermal blankets and "massage" or manipulate the thermal blankets to improve the fit and create a free movement path for the enclosed movable mechanical assembly. Thus, thermal blanket installation can be reliant on a technician's installation experience and can require regular "massaging" of the thermal blankets to meet clearance requirements. After determining that the thermal blanket will not get "snagged" in the moving mechanical assembly's moving parts, the thermal blankets may be hand-sewn or fitted in place. Not only does this hand-fitting process consume a great deal of time and expense, but the thermal blankets can tear during the process and must then be repaired or replaced. This can increase the expense of the thermal blankets and can add to the inspection costs to ensure that no tears go undetected. Other non-rigid components, such as harnesses and cables, may have similar issues to such known thermal blankets.

Because the thermal blankets and other non-rigid components are installation and configuration dependent, the remaining clearances allowing the moving mechanical assembly to perform its functions can vary unpredictably. Impedance to clearances with moving mechanical assemblies can potentially lead to deployment anomalies. Such deployment anomalies relating to the interference of known thermal blankets and harnesses around deployment interfaces can occur during satellite integration, testing, and on-orbit operations. Although known systems exist for thermal blankets at actuator interfaces, problems with deployment continue to occur. For example, required clearances to the moving mechanical assembly may not be maintainable and verifiable, and access to the moving mechanical assembly through the removal of thermal blankets can invalidate deployment tests. Moreover, resistive torque and snag potential of the thermal blankets can both be increased. Known thermal blankets of moving mechanical assemblies which designs can lack the support of any structure, such as "sock-shaped" or "bag-shaped" thermal blankets, typically do not provide consistent clearance between the thermal blanket and other equipment. Further, known thermal blanket designs, such as an "intelligent" thermal blanket design having internal seams and a somewhat more repeatable blanket shape through the deployment and stow cycles, can prove to be non-repeatable. In addition, "intelligent" thermal blanket deformation can result in impedance of an item of equipment or antenna's field of view and can prevent the item of equipment or antenna from functioning as required.

Known moving mechanical assemblies do not typically have good integration among their constituent parts and can experience installation variability, shape variability, insufficient engineering documentation, mislocated components, and ambiguous deployment interfaces.

Accordingly, there is a need in the art for an integrated articulating thermal isolation system and method that provides advantages over known systems and methods.

SUMMARY

This need for an improved integrated articulating thermal isolation system and method is satisfied. The system and method may provide numerous advantages as discussed in the below detailed description.

In one embodiment of the disclosure, there is provided an integrated articulating thermal isolation system. The system comprises an articulating actuator assembly. The system further comprises a support frame assembly attached to and enclosing the articulating actuator assembly. The system further comprises a thermal blanket assembly attached to and substantially enclosing the support frame assembly and the articulating actuator assembly. The thermal blanket assembly comprises a pair of non-articulating blankets positioned on exterior surfaces of the support frame assembly and a pair of articulating blankets disposed between the non-articulating blankets. Each articulating blanket has a plurality of stiffener elements. The system further comprises a harness assembly attached to the support frame assembly and positioned external to the articulating actuator assembly. The system further comprises a deployable assembly interface element attached to the support frame assembly. The system further comprises a vehicle interface element attached to the support frame assembly. When the articulating actuator assembly is actuated, the articulating blankets are guided by the support frame assembly from a stowed position to a deployed position through motion of the articulating actuator assembly.

In another embodiment of the disclosure, there is provided an integrated articulating thermal isolation system for use with a space vehicle. The system comprises an articulating actuator assembly comprising at least two separate articulated arm elements joined via a movable actuator. The system further comprises a support frame assembly attached to and enclosing the articulating actuator assembly. The support frame assembly comprises a first support frame attached to and overlapping with a second support frame. The system further comprises a thermal blanket assembly attached to and substantially enclosing the support frame assembly and the articulating actuator assembly. The thermal blanket assembly comprises a pair of non-articulating blankets positioned on exterior surfaces of the support frame assembly and a pair of articulating blankets disposed between the non-articulating blanket. Each articulating blanket has a plurality of stiffener elements. The system further comprises a harness assembly attached to the support frame assembly and positioned external to the articulating actuator assembly. The harness assembly comprises a harness routing element, a guide element, and one or more attachment brackets. The system further comprises a deployable assembly interface element attached to the support frame assembly. The system further comprises a space vehicle interface element attached to the support frame assembly. When the articulating actuator assembly is actuated, the articulating blankets are guided by the support frame assembly from a stowed position to a deployed position through motion of the movable actuator, and one articulating blanket unfolds as another articulating blanket folds.

In another embodiment of the disclosure, there is provided a method for controlling thermal blanket and harness assemblies enclosing an articulating actuator assembly in a space vehicle. The method comprises providing an integrated articulating thermal isolation system comprising an articulating actuator assembly and a support frame assembly attached to and enclosing the articulating actuator assembly. The system further comprises a thermal blanket assembly attached to and substantially enclosing the support frame assembly and the articulating actuator assembly. The thermal blanket assembly comprises a pair of non-articulating blankets positioned on exterior surfaces of the support frame assembly and a pair of articulating blankets disposed between the non-articulating blankets, each articulating blanket having a plurality of stiffener elements. The system further comprises a harness assembly attached to the support frame assembly and positioned external to the articulating actuator assembly. The system further comprises a deployment assembly interface element attached to the support frame assembly and a vehicle interface element attached to the support frame assembly. The method further comprises installing the system in a space vehicle and attaching the system to a deployable assembly on the space vehicle. The method further comprises actuating the articulating actuator assembly of the system so that the articulating blankets are guided by the support frame assembly from a stowed position to a deployed position through motion of the articulating actuator assembly, such that the thermal blanket assembly provides repeatable clearance to the articulating actuator assembly and the harness assembly.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
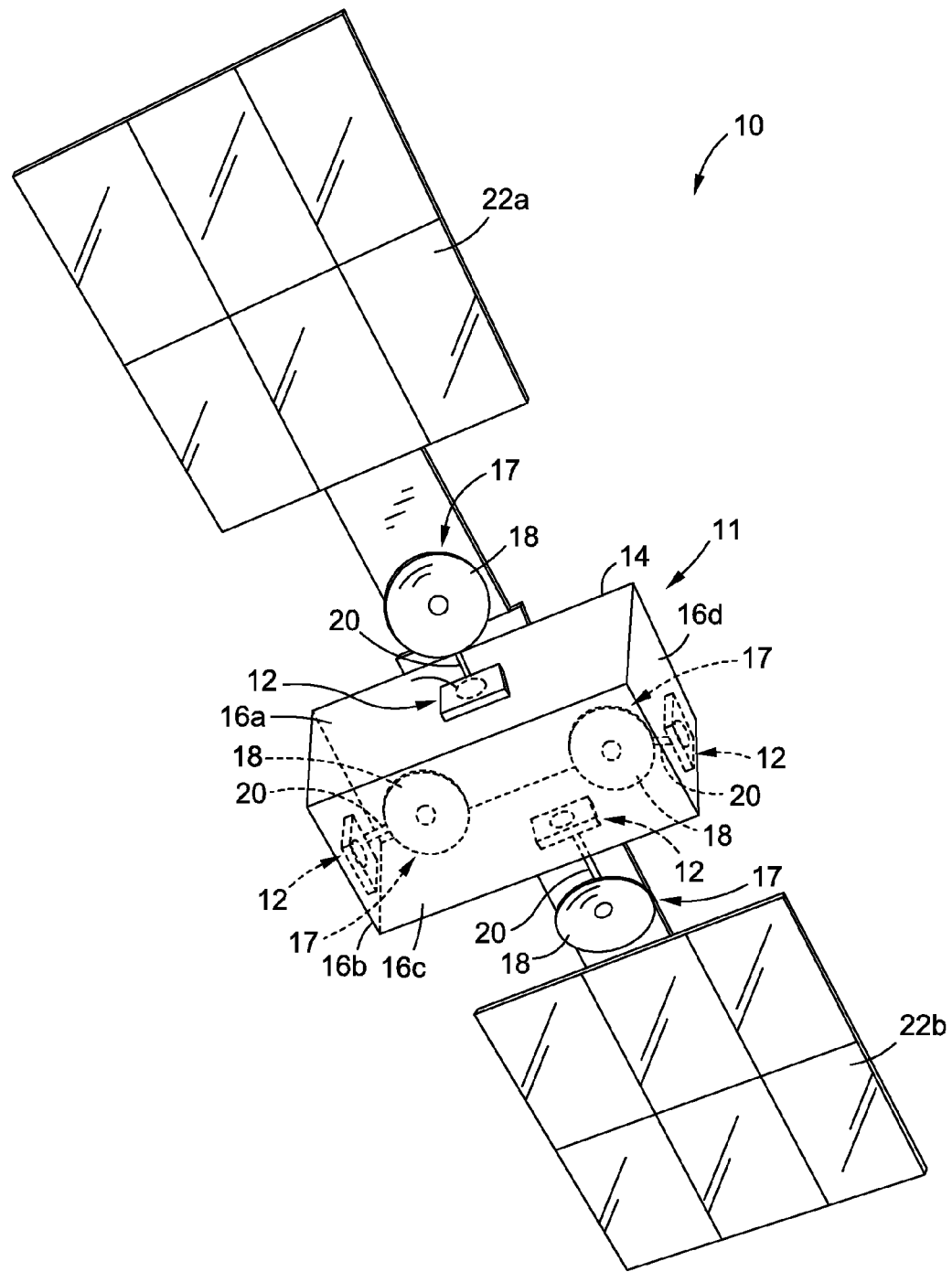
FIG. 1 is an illustration of a perspective view of a vehicle which may include one or more advantageous embodiments of the system and method of the disclosure.

FIG. 1 is an illustration of a perspective view of a vehicle 10 which may include one or more advantageous disclosed embodiments of an integrated articulating thermal isolation system 12 (see also FIG. 2) for controlling a thermal blanket assembly 80 (see FIG. 2) and a harness assembly 160 (see FIG. 2) and for providing repeatable clearance by the thermal blanket assembly 80 to an articulating actuator assembly 30 (see also FIG. 12) and to the harness assembly 160. As shown in an exemplary embodiment in FIG. 1, the vehicle 10 may comprise a space vehicle 11, such as a satellite, having a bus portion 14 with walls 16a, 16b, 16c, and 16d. The space vehicle 11 may further comprise at least one deployable assembly 17. The deployable assembly 17 may comprise, for example, an antenna 18 having an attached antenna boom 20. However, the deployable assembly 17 may also comprise a payload unit (not shown) or another suitable deployable assembly. As shown in FIG. 1, the space vehicle 11 has four deployable assemblies 17. The system 12 is beneficial for use on any space vehicle or satellite having deployable assemblies 17. The deployable assembly 17 may be attached to the system 12 via a deployable assembly interface element 192 (see FIGS. 2-3). The space vehicle 11 may further comprise solar panel portions 22a, 22b. Although an aerospace example is shown in FIG. 1, the principles of the system 12 may also be applied to other suitable vehicles or structures.

Figure 2:
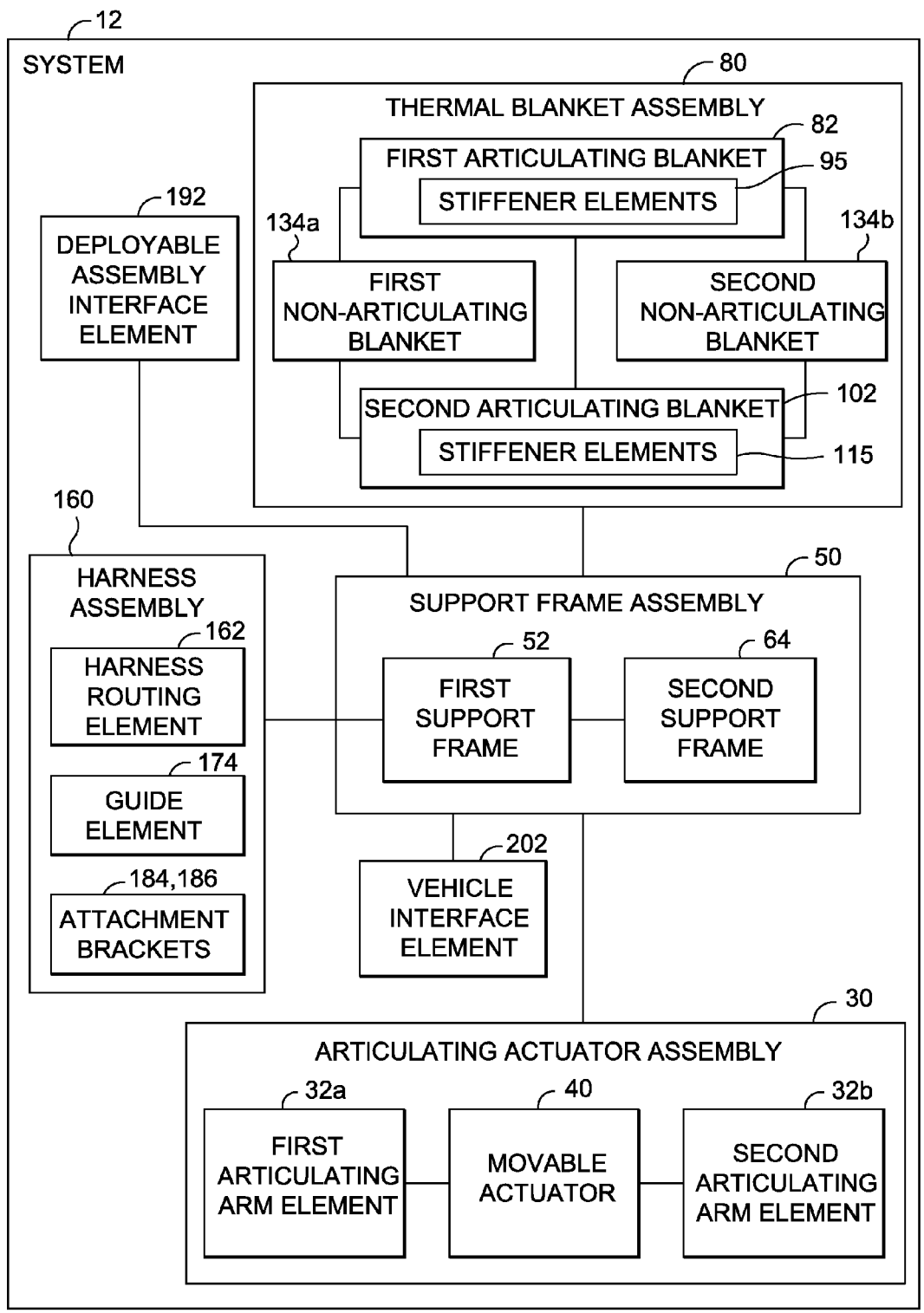
FIG. 2 is an illustration of a block diagram of one of the embodiments of the system of the disclosure.
Figure 11:
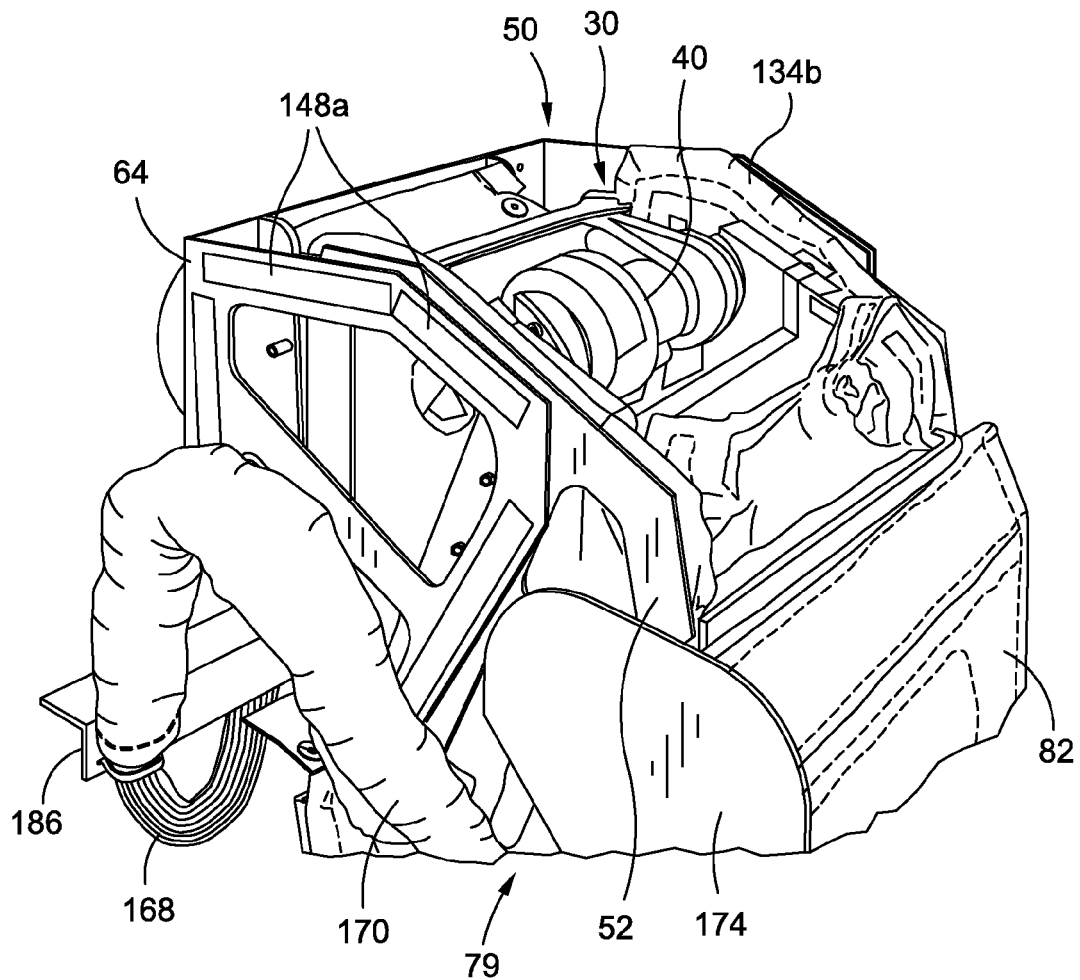
FIG. 11 is an illustration of a front left close-up view of the articulating actuator assembly of one of the embodiments of the system of the disclosure.
Figure 12:
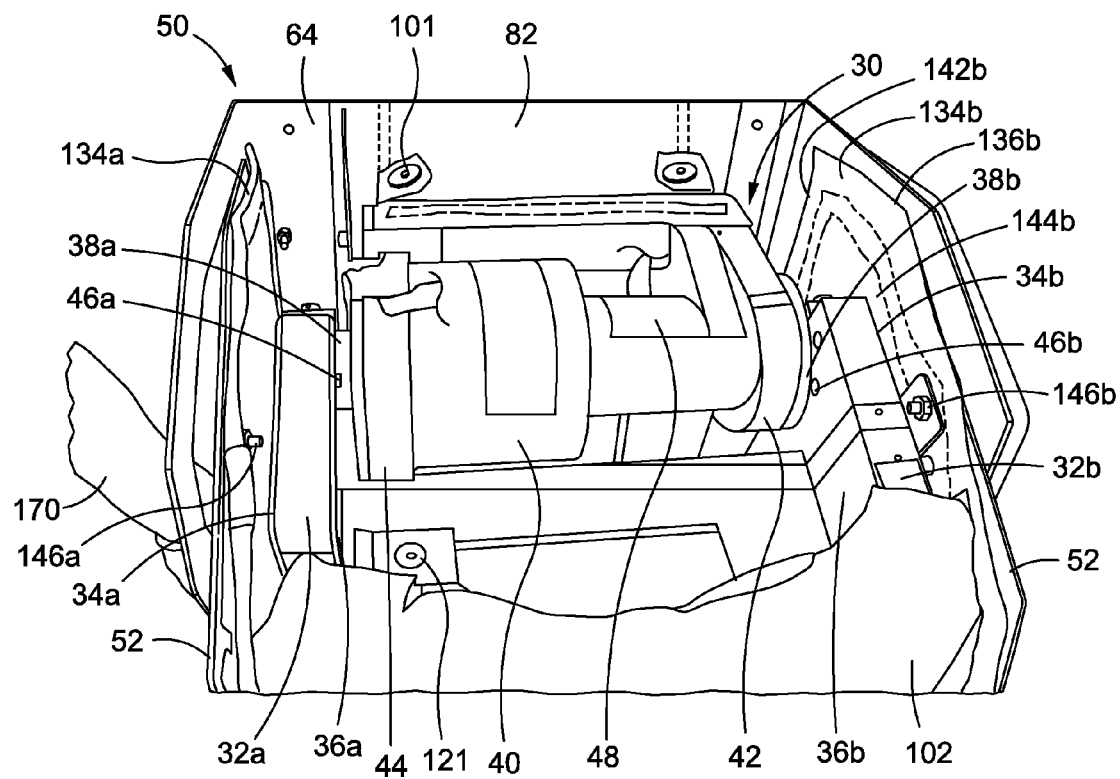
FIG. 12 is an illustration of a front close-up view of the articulating actuator assembly of FIG. 11.

FIG. 2 is an illustration of a block diagram of one of the embodiments of the system 12 of the disclosure. As shown in FIG. 2, the system 12 comprises an articulating actuator assembly 30. FIG. 11 is an illustration of a front left close-up view of the articulating actuator assembly 30 of one of the embodiments of the system 12 of the disclosure. FIG. 12 is an illustration of a front close-up view of the articulating actuator assembly 30 of FIG. 11. As shown in FIG. 12, the articulating actuator assembly 30 comprises at least two separate first and second articulated arm elements 32a, 32b joined via a movable actuator 40. As shown in FIG. 12, the first articulated arm element 32a has an exterior side 34a and an interior side 36a, and the second articulated arm element 32b has an exterior side 34b and an interior side 36b. The movable actuator 40 has a first end 44 and a second end 42. The first end 44 of the movable actuator 40 is attached to the first articulated arm element 32a via attachment element 46a, and the second end 42 of the movable actuator 40 is attached to the second articulated arm element 32b via attachment element 46b. The first end 44 of the movable actuator 40 forms a first pivot point 38a with the first articulated arm element 32a. The second end 42 of the movable actuator 40 forms a second pivot point 38b with the second articulated arm element 32b. The movable actuator 40 may further comprise a motor element 48 for providing power to move or actuate the movable actuator 40. Preferably, the movable actuator 40 actuates at a 180 degree deployment angle or another suitable angle.

Figure 3:
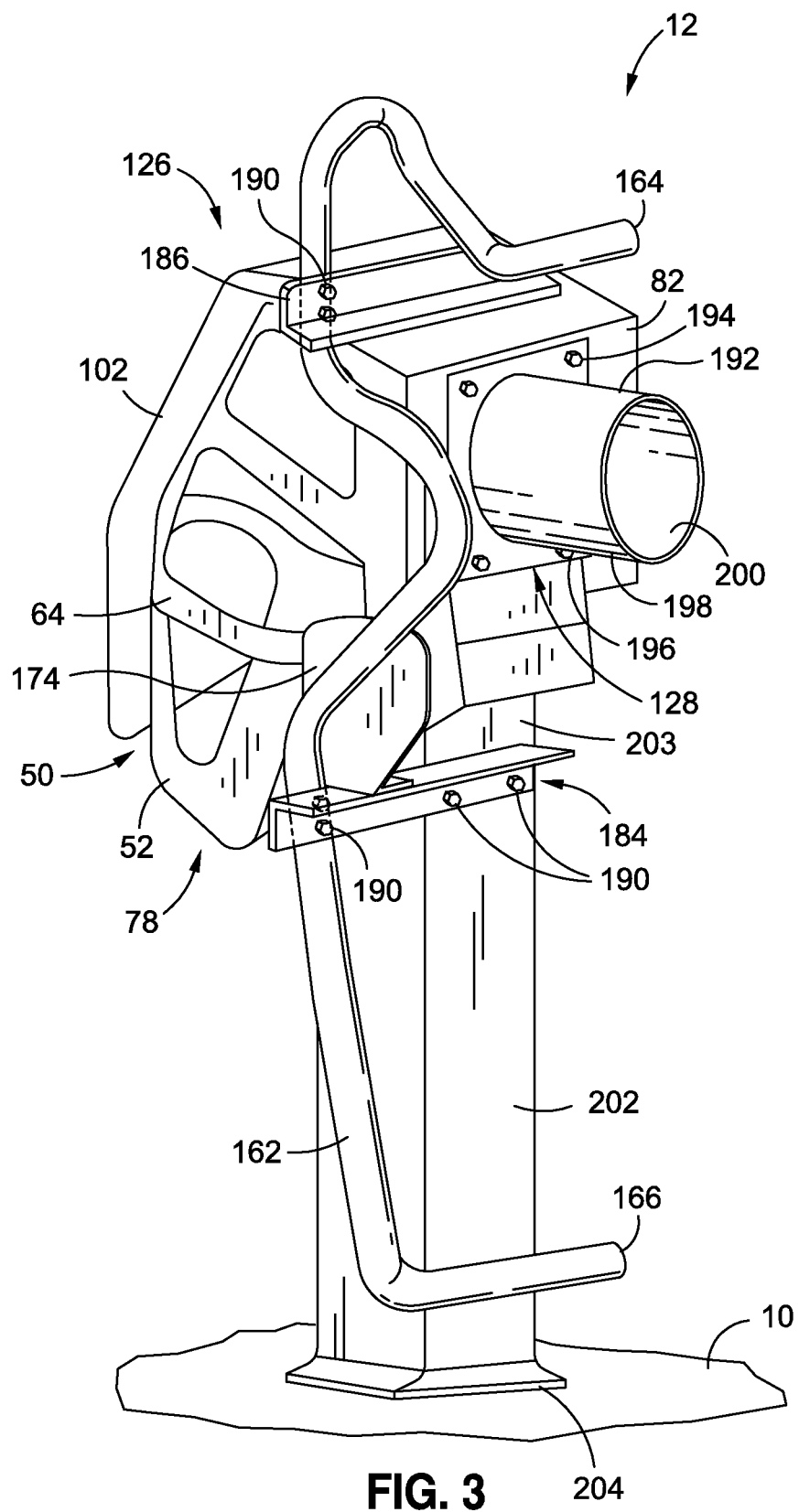
FIG. 3 is an illustration of a front left perspective view of one of the embodiments of the system of the disclosure in a stowed position.
Figure 4:
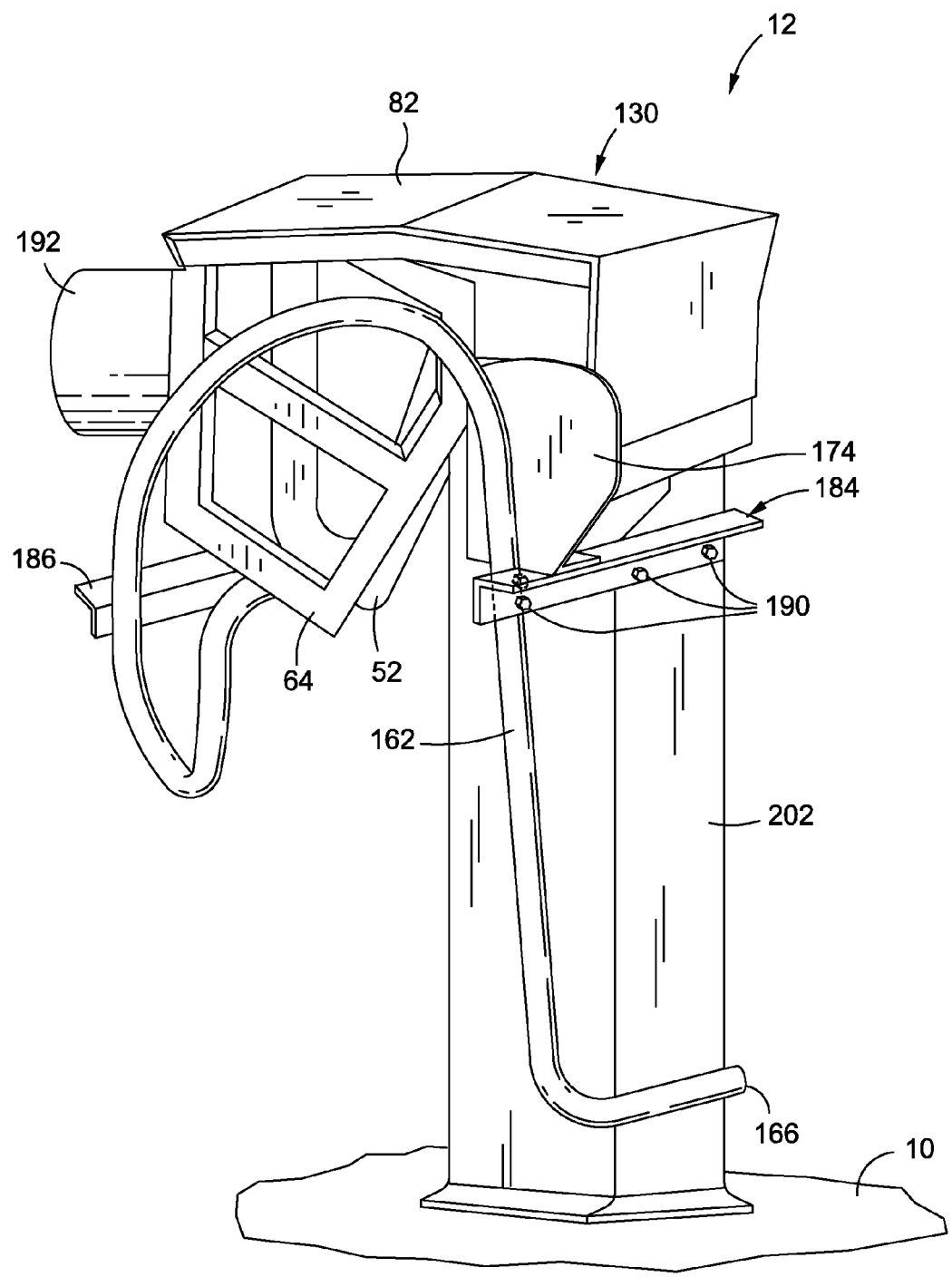
FIG. 4 is an illustration of a front left perspective view of the system of FIG. 3 in a fully deployed position.
Figure 5:
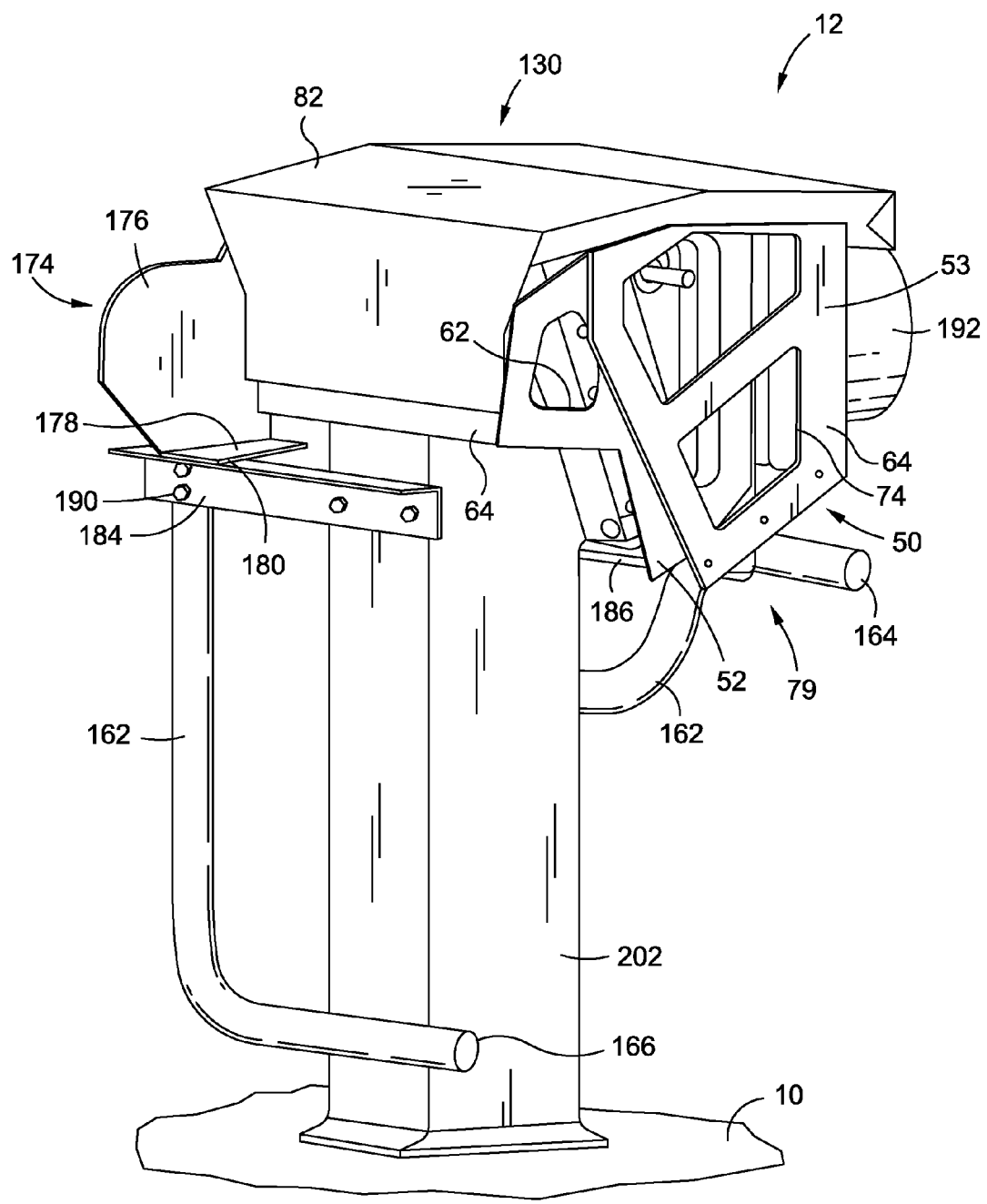
FIG. 5 is an illustration of a front right perspective view of the system of FIG. 3 in a fully deployed position.
Figure 7:
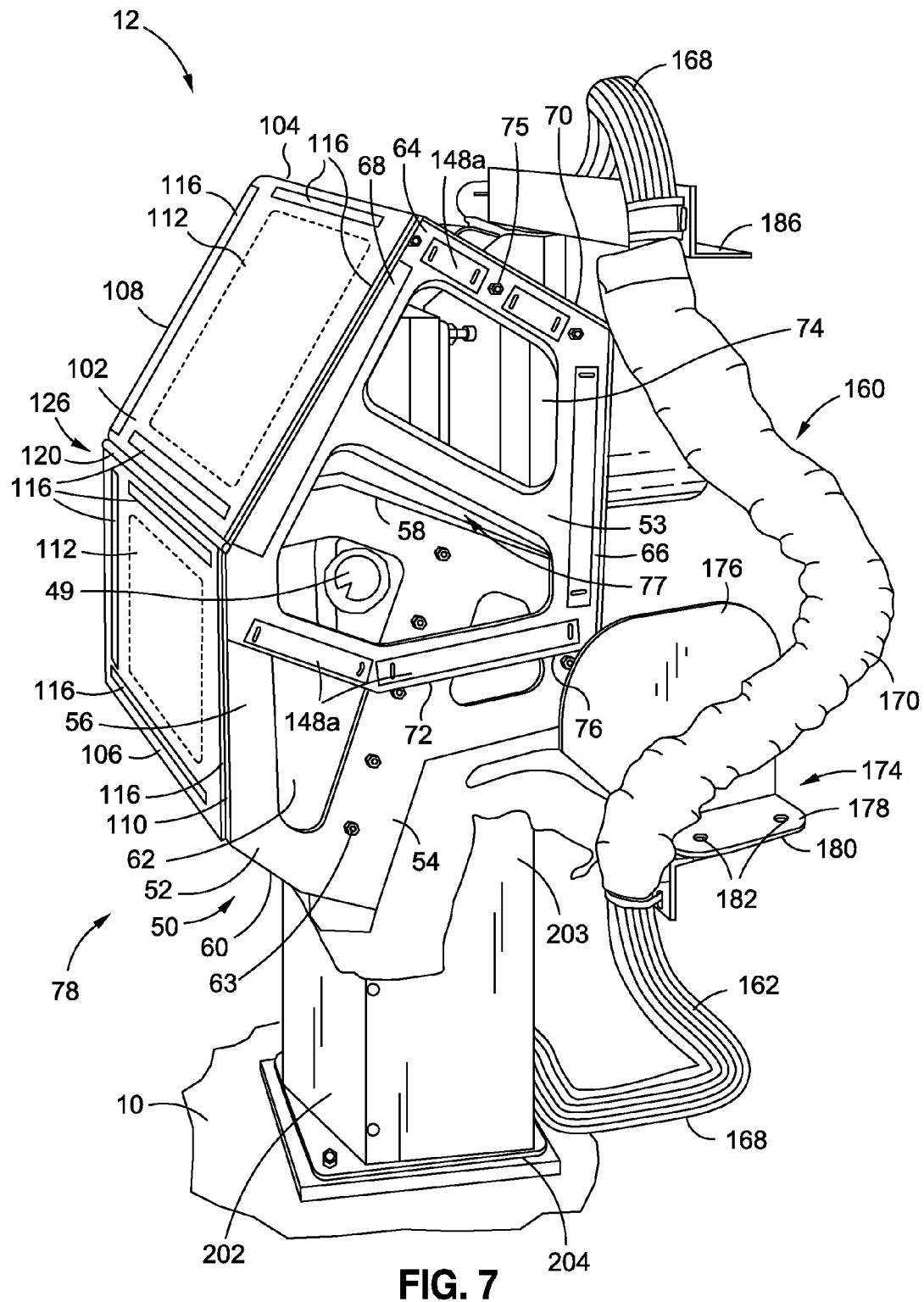
FIG. 7 is an illustration of a left side perspective view of another one of the embodiments of the system of the disclosure in a stowed position.

As shown in FIGS. 2-3, the system 12 further comprises a support frame assembly 50 attached to and enclosing the articulating actuator assembly 30. As shown in FIG. 3, the support frame assembly 50 comprises a first support frame 52 attached to and overlapping with a second support frame 64. As shown in FIG. 7, the first support frame 50 comprises a first side 54, a second side 56, a top end 58, and a bottom end 60. The first support frame 50 may further comprise one or more cut-out portions 62. As shown in FIG. 7, the first support frame 50 is preferably attached to a vehicle interface structure 202 (see also FIG. 4) via one or more attachment elements 63, such as nuts and bolts or another suitable attachment element. The first support frame 50 is preferably fixed and does not move. As shown in FIG. 7, the second support frame 64 comprises a first side 66, a second side 68, a top end 70, and a bottom end 72. The second support frame 64 may further comprise one or more cut-out portions 74. The second support frame 64 may be attached to the articulating actuator assembly 30 via one or more attachment elements 75, such as nuts and bolts or another suitable attachment element. The second support frame 64 is preferably movable or deployable about the first support frame 52 and is attached to the first support frame 52 via a pivot attachment portion 76. Preferably, the first support frame 52 and the second support frame 64 form an overlapping configuration 77 such that the first support frame 52 is at least partially enclosed by the second support frame 64. The support frame assembly 50 may be made of a lightweight metal, such stainless steel, aluminum, titanium, or other suitable metals, or may be made of non-metallic structural materials, such as carbon fiber composites or plastics. As shown in FIG. 7, the support frame assembly 50 is in a stowed position 78. As shown in FIG. 5, the support frame assembly 50 is in a fully deployed position 79. The support frame assembly 50 is preferably optimized for repeatable clearances (e.g., at least 0.50 inch) and field of view, preferably has no snag potential, preferably provides shape and repeatability of installation and accessibility, preferably provides access to the articulating actuator assembly 30, including temperature controls 49 (see FIG. 7), preferably provides removal for installation of lock-out plates (not shown), and preferably provides for attachment to the deployable assembly 17, such as the antenna 18 and attached antenna boom 20, and or another deployable assembly, through secondary structure first and second attachment brackets 184, 186 (see FIG. 3) out of a direct load path.

Figure 8:
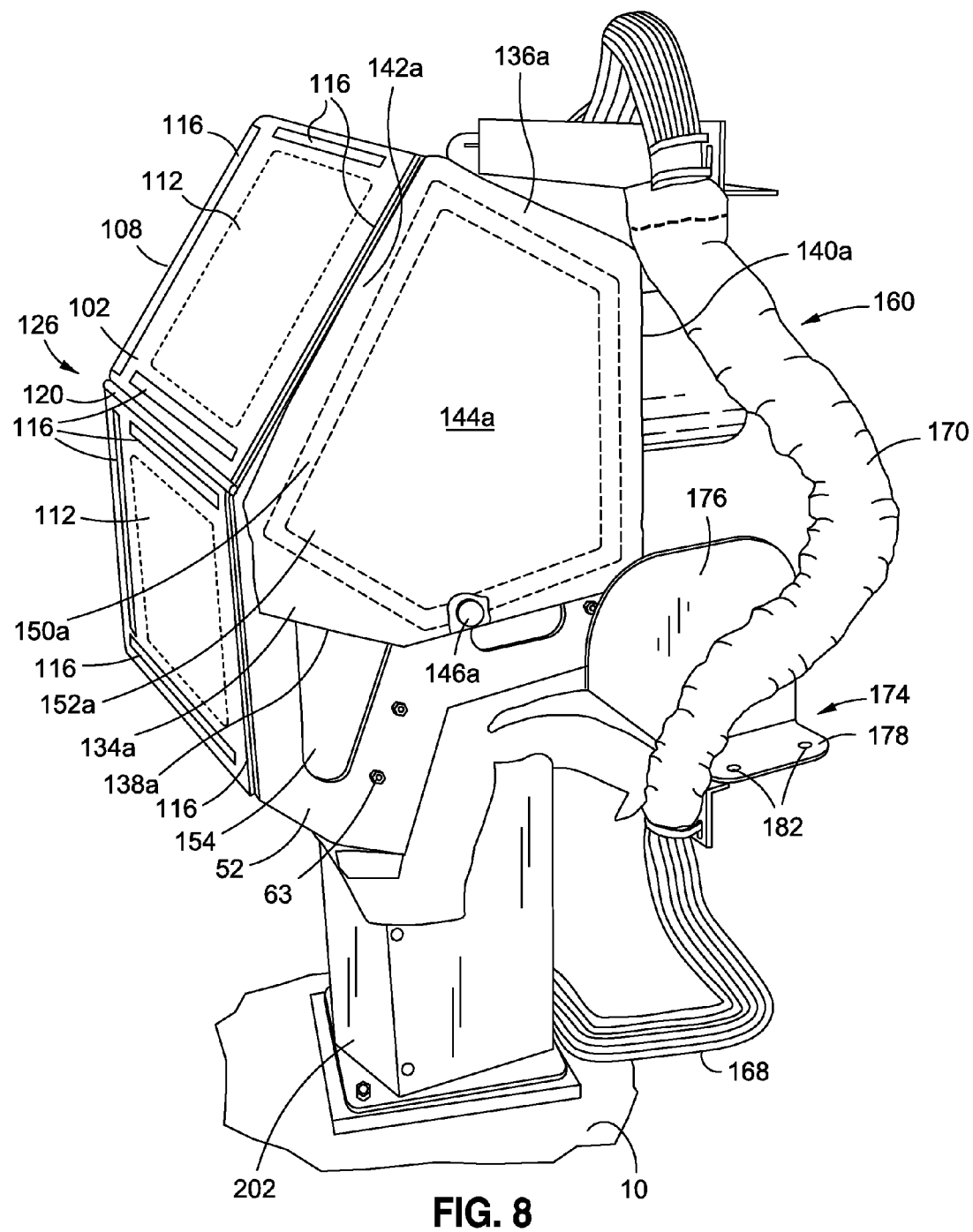
FIG. 8 is an illustration of a left side perspective view of the system of FIG. 7 showing a non-articulating blanket attached.

As shown in FIG. 2, the system 12 further comprises a thermal blanket assembly 80 attached to and substantially enclosing the support frame assembly 50 and also enclosing the articulating actuator assembly 30. The thermal blanket assembly 80 comprises a pair of first and second non-articulating blankets 134a, 134b each positioned on opposed exterior surfaces 53 (see FIGS. 5 and 7) of opposed second support frames 64 of the support frame assembly 50. FIG. 8 is an illustration of a left side perspective view of the system 12 of FIG. 7 showing non-articulating blanket 134a attached to the second support frame 64. Each of the first and second non-articulating blankets 134a, 134b may be attached to the opposed exterior surface 53 of the opposed second support frames 64 via one or more attachment elements 148a (see FIG. 7), such as hook and loop elements or another suitable attachment element. The first and second non-articulating blankets 134a, 134b are preferably completely or partially removable from the second support frame 64 of the support frame assembly 50 to provide access to the articulating actuator assembly 30 without invalidating deployment testing. As shown in FIG. 8, the first non-articulating blanket 134a comprises a top end 136a, a bottom end 138a, a first side 140a, a second side 142a, and a panel 144a. The first non-articulating blanket 134a may be attached to the second support frame 64 with connector 146a and one or more attachment elements 148a (see FIG. 7). Opposite the first non-articulating blanket 134a is a substantially mirror image second non-articulating blanket 134b (see FIG. 12) comprising a top end 136b, a bottom end 138b, a first side 140b, a second side 142b, and a panel 144b. The first and second non-articulating blankets 134a, 134b may be installed to predesigned attachment locations on the second support frame 64, and therefore can preferably be installed in a single configuration. Removal and reinstallation of the first and second non-articulating blankets 134a, 134b to and from the second support frame 64 will not invalidate prior deployment tests.

As shown in FIGS. 2-3 and 8, the thermal blanket assembly 80 further comprises a pair of first and second articulating blankets 82, 102 preferably disposed between the first and second non-articulating blankets 134a, 134b. When the articulating actuator assembly 30 is actuated, the first and second articulating blankets 82, 102 are guided by the support frame assembly 30 from a stowed position 78 (see FIG. 3) to a fully deployed position 79 (see FIG. 5) through motion of the articulating actuator assembly 30. Preferably, when the first and second articulating blankets 82, 102 are guided by the support frame assembly 30 from the stowed position 78 to the fully deployed position 79, one articulating blanket unfolds as another articulating blanket folds.

Figure 6:
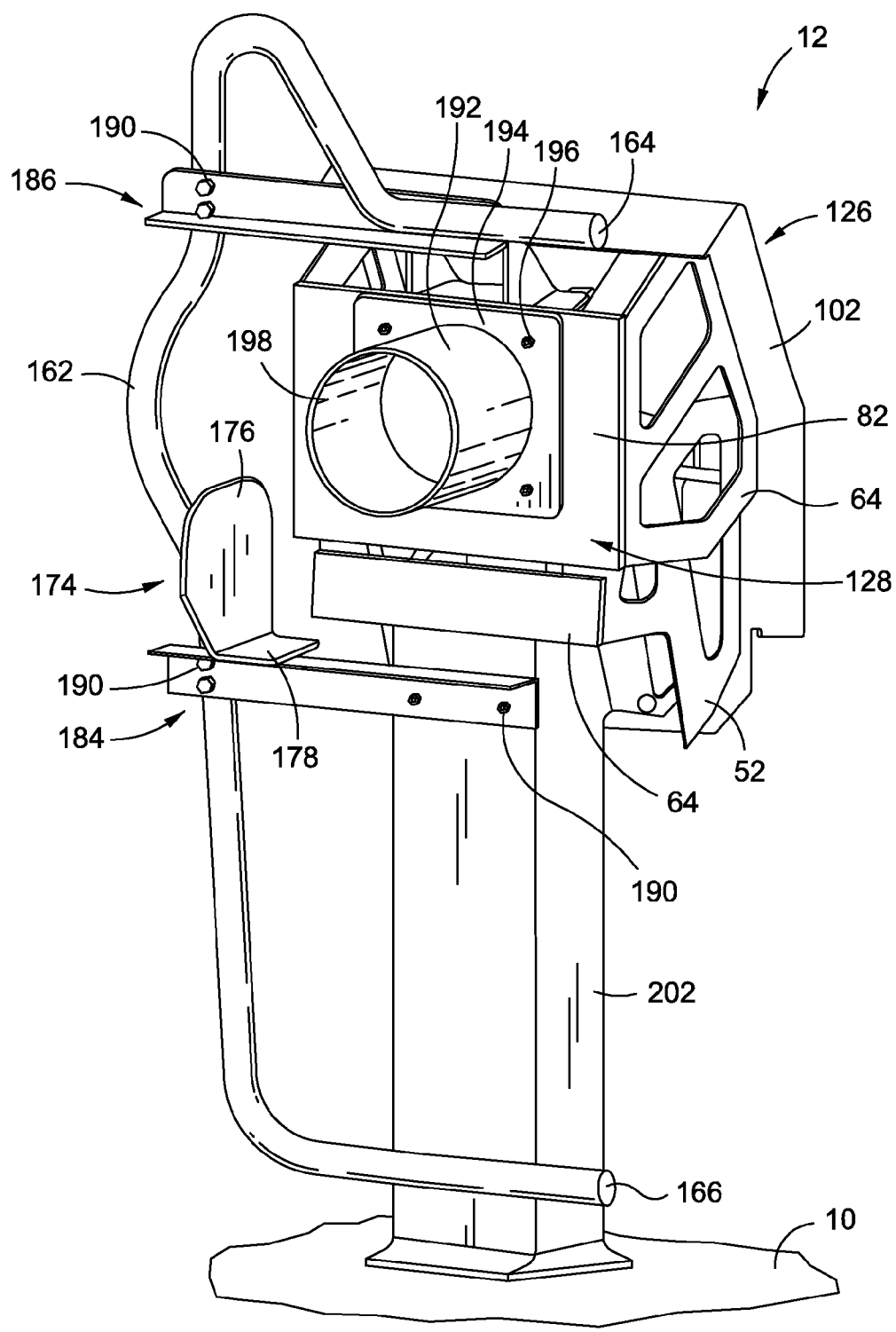
FIG. 6 is an illustration of a front right perspective view of the system of FIG. 3 in a stowed position.
Figure 9:
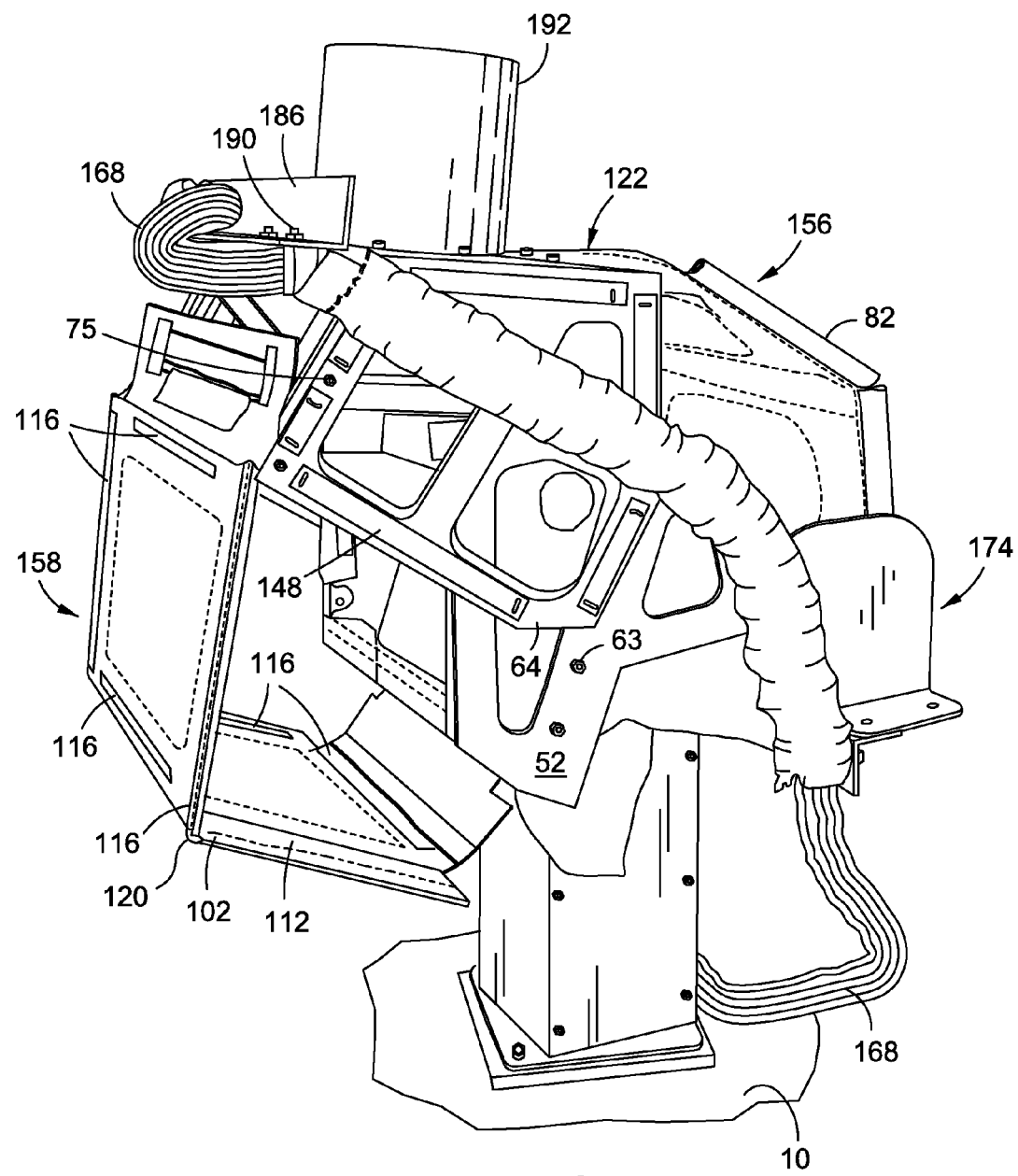
FIG. 9 is an illustration of a left side perspective view of the system of FIG. 7 in a mid-deployed position.
Figure 10:
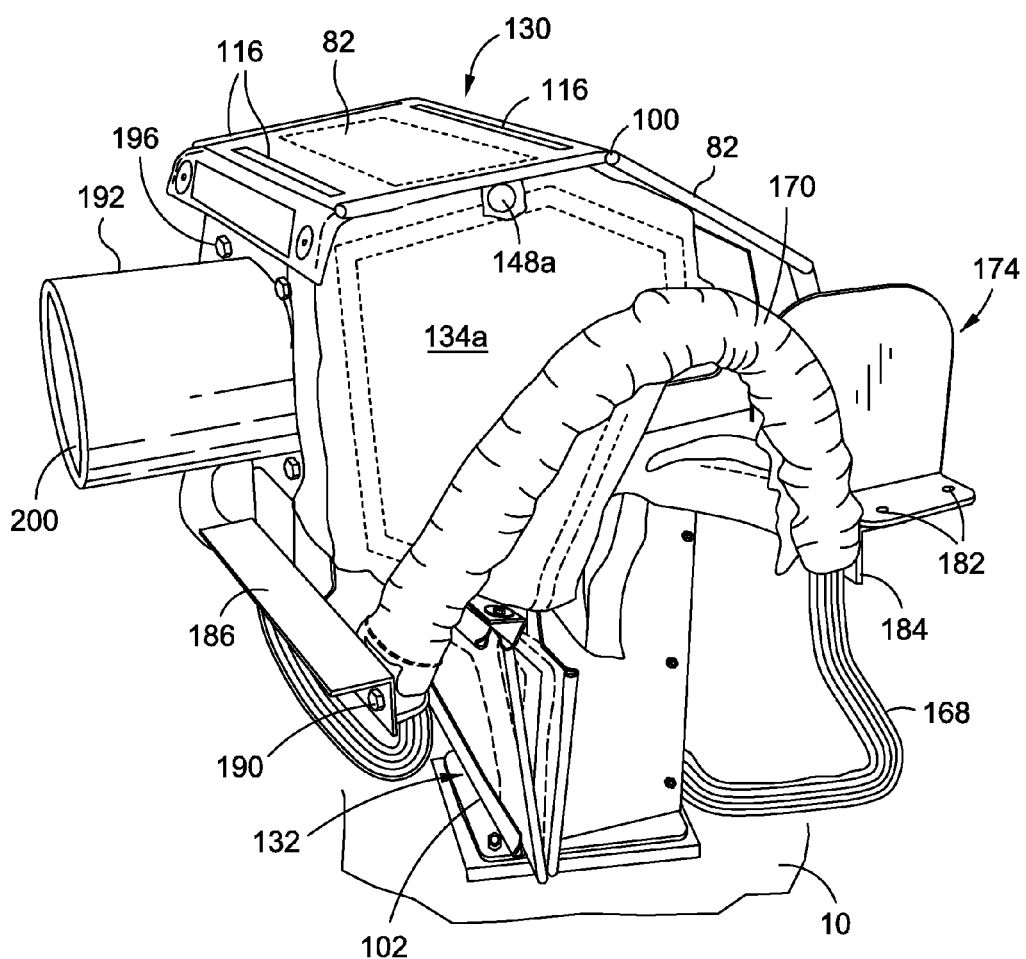
FIG. 10 is an illustration of a left side perspective view of the system of FIG. 7 in a fully deployed position.

FIG. 3 is an illustration of a front left perspective view of one of the embodiments of the system 12 of the disclosure where the first articulating blanket 82 is in a first articulating blanket stowed position 128, and the second articulating blanket 102 is in a second articulating blanket stowed position 126. FIG. 4 is an illustration of a front left perspective view of the system 12 of FIG. 3 where the first articulating blanket 82 is in a first articulating blanket fully deployed position 130. FIG. 5 is an illustration of a front right perspective view of the system 12 of FIG. 3 where the first articulating blanket 82 is in the first articulating blanket fully deployed position 130. FIG. 6 is an illustration of a front right perspective view of the system 12 of FIG. 3 where the first articulating blanket 82 is in the first articulating blanket stowed position 128 and the second articulating blanket 102 is in the second articulating blanket stowed position 126. FIG. 7 is an illustration of a left side perspective view of another one of the embodiments of the system 12 of the disclosure where the second articulating blanket 102 is in the second articulating blanket stowed position 126. FIG. 9 is an illustration of a left side perspective view of the system 12 of FIG. 7 where the first articulating blanket 82 is in a first articulating blanket mid-deployed position 156 and the second articulating blanket 102 is in a second articulating blanket mid-deployed position 158. FIG. 10 is an illustration of a left side perspective view of the system of FIG. 7 where the second articulating blanket is in a second articulating blanket fully deployed position 132.

Figure 13:
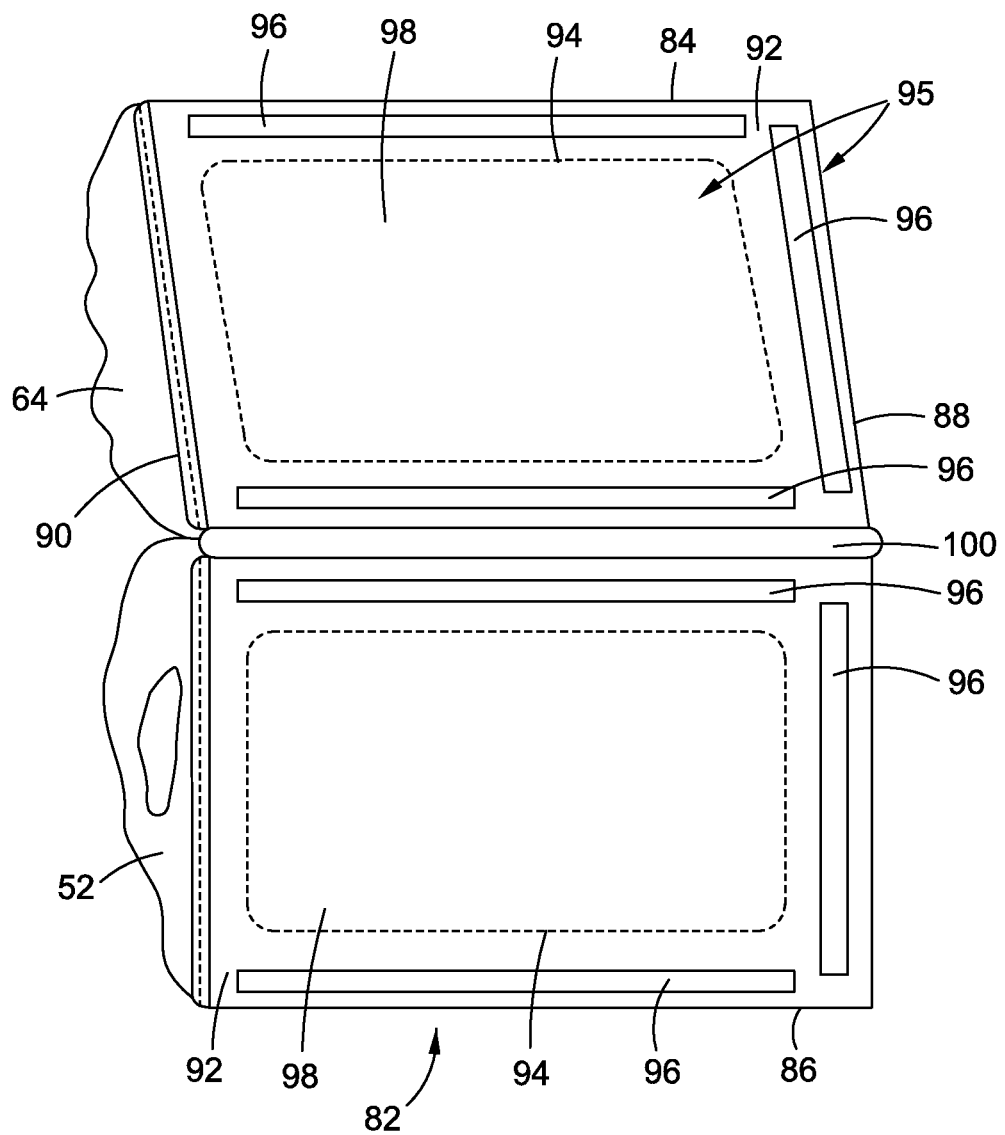
FIG. 13 is an illustration of a front perspective view of one of the embodiments of a first articulating blanket of the system of the disclosure.
Figure 14:
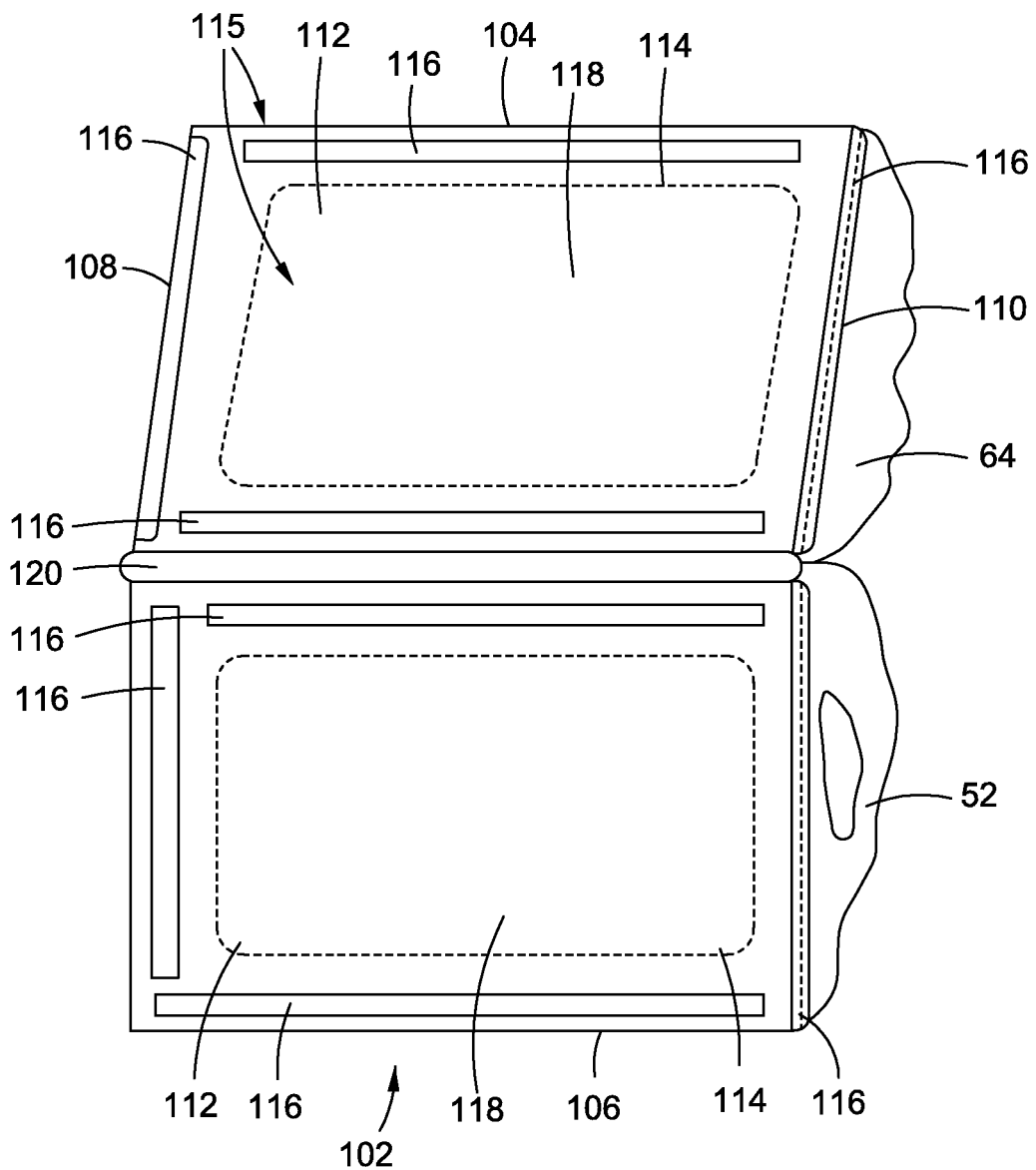
FIG. 14 is an illustration of a front perspective view of one of the embodiments of a second articulating blanket of the system of the disclosure; and, FIG. 15 is an illustration of a flow diagram of one of the embodiments of a method of the disclosure.

FIG. 13 is an illustration of a front perspective view of one of the embodiments of the first articulating blanket 82 of the system 12 of the disclosure. FIG. 14 is an illustration of a front perspective view of one of the embodiments of the second articulating blanket 102 of the system 12 of the disclosure. The first and second articulating blankets 82, 102 and the first and second non-articulating blankets 134a, 134b are preferably formed of several layers of isolation material, such as a plastic film KAPTON material which is a strong, lightweight, and flexible material with at least one layer comprised of vacuum deposited aluminum (VDA). (KAPTON is a registered trademark owned by E.I. Dupont Demours of Wilmington, Del.) KAPTON exhibits very little out-gassing and is a preferred material for the thermal blankets when used in aerospace applications. The first and second articulating blankets 82, 102 and the first and second non-articulating blankets 134a, 134b of the thermal blanket assembly 80 may also be comprised of other suitable lightweight and flexible plastic materials. The first and second articulating blankets 82, 102 and the first and second non-articulating blankets 134a, 134b of the thermal blanket assembly 80 may be made and formed as disclosed in U.S. Pat. No. 5,997,973, "Articulating Thermal Membrane with Integral Hinges", which is incorporated herein by reference in its entirety.

As shown in FIG. 13, the first articulating blanket 82 comprises a top end 84, a bottom end 86, a first side 88, and a second side 90. The first articulating blanket 82 further comprises one or more panels 92 having a sewn hinge pattern 94 and forming a soft hinge 100 between the panels 92. The first articulating blanket 82 preferably has a plurality of stiffener elements 95. The plurality of stiffener elements 95 preferably comprises one or more folded stiffener elements 96 and one or more flat stiffener elements 98. The first articulating blanket 82 is preferably attached to the support frame assembly 50 via one or more attachment elements 101 (see FIG. 12). As shown in FIG. 14, the second articulating blanket 102 comprises a top end 104, a bottom end 106, a first side 108, and a second side 110. The second articulating blanket 102 further comprises one or more panels 112 having a sewn hinge pattern 114 and forming a soft hinge 120 between the panels 112. The second articulating blanket 102 preferably has a plurality of stiffener elements 115. The plurality of stiffener elements 115 preferably comprises one or more folded stiffener elements 116 and one or more flat stiffener elements 118. The second articulating blanket 102 is preferably attached to the support frame assembly 50 via one or more attachment elements 121 (see FIG. 12). The first articulating blanket 82 and the second articulating blanket 102 preferably form an overlapping configuration 122 (see FIG. 9). Preferably, the first and second articulating blankets 82, 102 are rigid. Preferably, the stiffener elements 95, 115 are comprised of discontinuous 0.005 inch thick KAPTON material to provide "hinge" capability. The first and second articulating blankets 82, 102 may have flap portions to achieve optimal thermal enclosure of the articulating actuator assembly 30. Although the thermal blanket assembly 80 is shown with attachment elements and connectors in the form or nuts and bolts and hook and loop elements, other attachment elements and connectors, such as snaps, fastener tape, buttons, or other suitable attachment element and connectors, may be used.

As shown in FIGS. 2-3 and 7, the system 12 further comprises a harness assembly 160 attached to the support frame assembly 50. The harness assembly 160 may preferably, but not exclusively, be positioned external to the articulating actuator assembly 30. The harness assembly 160 preferably comprises a harness routing element 162. As shown in FIG. 3, the harness routing element 162 comprises a first end 164 and a second end 166. As shown in FIG. 7, the harness routing element 162 preferably comprises a plurality of wires 168. The harness assembly 160 may further comprise a harness thermal blanket 170 that substantially covers the harness routing element 162 (see FIG. 7). The harness thermal blanket 170 may be comprised of KAPTON or another suitable material. The harness assembly 160 preferably further comprises a guide element 174. As shown in FIG. 7, the guide element 174 comprises a first back portion 176 and second platform portion 178 attached to and forming a substantially right angle with the first back portion 176. The second platform portion 178 may have a bottom portion 180 with openings 182 for attachment. The harness assembly 160 preferably further comprises first attachment bracket 184 and second attachment bracket 186 (see FIGS. 2-3). First and second attachment brackets 184, 186 restrain the harness routing element 162 in order to eliminate interference with the first and second articulating blankets 82, 102. As shown in FIG. 2, the first attachment bracket 184 may be attached to the harness routing element 162 and to the vehicle interface structure 202 via one or more connectors 190, such as nuts and bolts or other suitable connectors. The bottom portion 180 of the guide element 174 may be positioned on and supported by the first attachment bracket 184. As shown in FIG. 3, second attachment bracket 186 may be attached to the harness routing element 162 via one or more connectors 190, such as nuts and bolts or other suitable connectors. The first end 164 of the harness routing element 162 may be positioned on or supported by the second attachment bracket 186. The harness routing element 162, guide element 174, and first and second attachment brackets 184, 186 may preferably be made of a lightweight, rigid metal material, such as stainless steel, aluminum, titanium, or another suitable rigid metal material, or non-metallic structural materials, such as carbon fiber composites or plastics. The harness assembly 160 may preferably, but not exclusively, be routed separately from the articulating actuator assembly 30 containing the temperature controls 49

(see FIG. 7). The harness assembly 160 may be controlled and designed with a specified length between the attachment points of the first attachment bracket 184 and the second attachment bracket 186.

As shown in FIGS. 2-3, the system 12 further comprises a deployable assembly interface element 192 attached to the support frame assembly 50. The deployable assembly interface element 192 is preferably attached to the deployable assembly 17 (see FIG. 1) comprising an antenna 18 and an attached antenna boom 20, a payload unit (not shown), or another suitable deployable assembly. As shown in FIG. 3, the deployable assembly interface element 192 comprises a panel portion 194 attached to support frame assembly 50 and attached to first articulating blanket 82 via one or more connectors 196, such as nuts and bolts or other suitable connectors. The deployable assembly interface element 192 further comprises a cylinder portion 198 having an opening 200 for insertion of the deployable assembly 17, and in particular, the antenna boom 20.

As shown in FIGS. 2-3, the system 12 further comprises a vehicle interface element 202 having a first end 203 (see FIG. 3) and a second end 204 (see FIG. 3). The first end 203 is preferably attached to the support frame assembly 50 and the second end 204 is preferably attached to the vehicle 10 (see FIG. 1). The vehicle interface element 202 preferably comprises a post, a tripod, or another suitable vehicle interface element.

Preferably, the system 12 may be used with a vehicle 10, such as a space vehicle 11 (see FIG. 1). Preferably, the system 12 improves repeatability of installation and reliability during deployment by reducing resistive torque in the first and second articulating blankets 82, 102, by eliminating snag potential, and by eliminating incidence of deployment testing invalidation. Preferably, the thermal blanket assembly 80 provides repeatable clearance to the articulating actuator assembly 30 and the harness assembly 160. Preferably, the repeatable clearance is at least 0.50 inch but such repeatable clearance may vary depending on the tolerance and requirements of the user, for example, such repeatable clearance may be reduced depending on the tolerance and requirements of the user.

Figure 15:
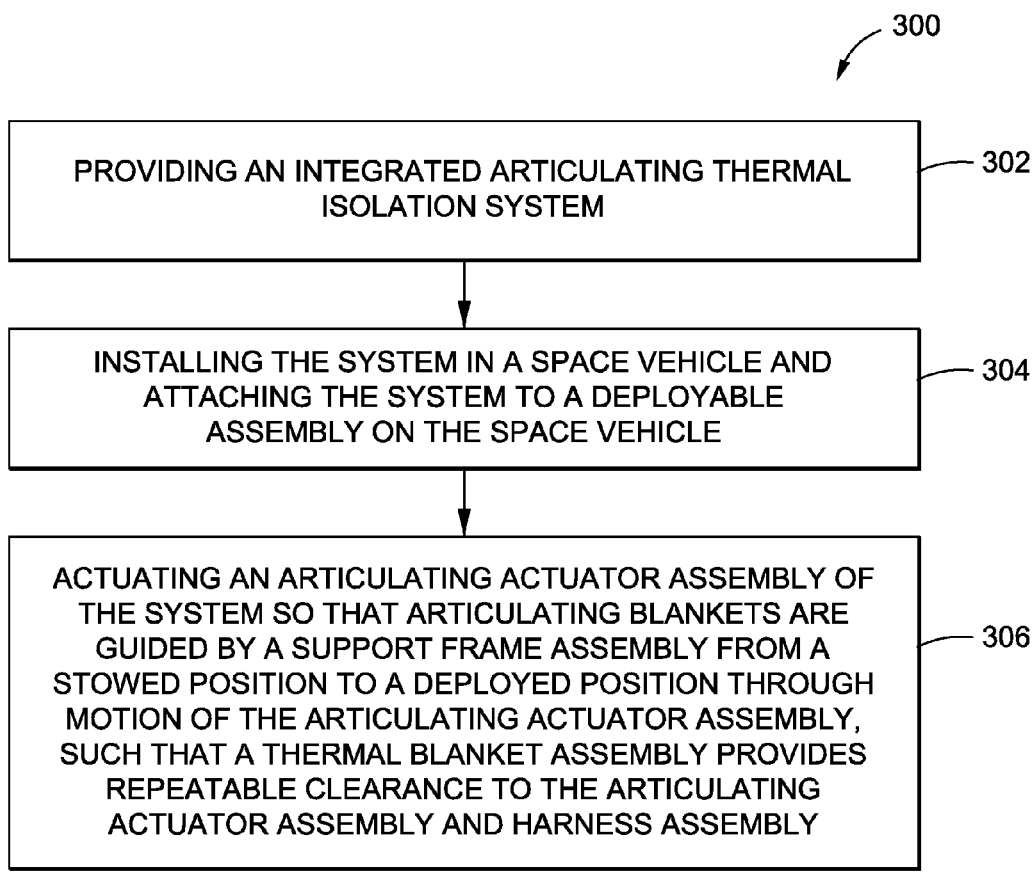

In another embodiment of the disclosure, there is provided a method 300 for controlling thermal blanket and harness assemblies 80, 160, respectively, enclosing an articulating actuator assembly 30 in a space vehicle 11 (see FIG. 1). FIG. 15 is an illustration of a flow diagram of one of the embodiments of the method 300 of the disclosure. The method 300 comprises step 302 of providing an integrated articulating thermal isolation system 12 (see FIG. 2). The system 12, as discussed above, and as shown in FIG. 2, comprises an articulating actuator assembly 30, a support frame assembly 50 attached to and enclosing the articulating actuator assembly 30, and a thermal blanket assembly 80 attached to and substantially enclosing the support frame assembly 50 and the articulating actuator assembly 30. The thermal blanket assembly 80 comprises a pair of first and second non-articulating blankets 134a, 134b positioned on opposed exterior surfaces 53 of the support frame assembly 50 and a pair of first and second articulating blankets 82, 102 disposed between the first and second non-articulating blankets 134a, 134b. Each first and second articulating blanket 82, 102 has a plurality of stiffener elements 95, 115, respectively. The system 12 further comprises harness assembly 160 attached to the support frame assembly 50 and positioned external to the articulating actuator assembly 30. The system 12 further comprises a deployable assembly interface element 192 attached to the support frame assembly 50. The system 12 further comprises a vehicle interface element 202 attached to the support frame assembly 50.

The method 300 further comprises step 304 of installing the system 12 in a space vehicle 11 (see FIG. 1) and attaching the system 10 to a deployable assembly 17 on the space vehicle 11. The method 300 further comprises step 306 of actuating the articulating actuator assembly 30 of the system 12 so that the first and second articulating blankets 82, 102 are guided by the support frame assembly 50 from a stowed position 78 to a deployed position 79 through motion of the articulating actuator assembly 30, such that the thermal blanket assembly 80 provides repeatable clearance to the articulating actuator assembly 30 and the harness assembly 160. Preferably, the repeatable clearance is at least 0.50 inch but such repeatable clearance may vary depending on the tolerance and requirements of the user, for example, such repeatable clearance may be reduced depending on the tolerance and requirements of the user. Preferably, when the first and second articulating blankets 82, 102 are guided by the support frame assembly 50 from the stowed position 78 to the deployed position 79, one articulating blanket unfolds as another articulating blanket folds. Preferably, the thermal blanket assembly 80 provides repeatable clearance to the articulating actuator assembly 30 and the harness assembly 160 of at least 0.50 inch but such repeatable clearance may vary depending on the tolerance and requirements of the user, for example, such repeatable clearance may be reduced depending on the tolerance and requirements of the user. Preferably, the method 300 improves repeatability of installation and reliability during deployment by reducing resistive torque in the articulating blankets, by eliminating snag potential, and by eliminating incidence of deployment testing invalidation. Preferably, the first and second non-articulating blankets 134a, 134b are removable to provide access to the articulating actuator assembly 30 without invalidating deployment testing. Preferably, the method 300 allows the system 12 to be installed as a single system with minimal or no rework or reinstallation required.

The method 300 provides for a system 12 that improves repeatability of installation and reliability during deployment by reducing resistive torque in the articulating blankets 82, 102, by eliminating snag potential of the articulating blankets 82, 102, and by eliminating incidence of deployment testing invalidation. Further, the method 300 provides a system 12 where the first and second non-articulating blankets 134a, 134b are removable to provide access to the articulating actuator assembly 30 without invalidating deployment testing. Moreover, the method 300 allows the system 12 to be installed as a single system in a vehicle 10, such as a space vehicle 11, with minimal or no rework or reinstallation required.

The system 12 and method 300, as disclosed herein, provide numerous advantages over known systems and methods. The system 12 and method 300 improve repeatability of installation and reliability during deployment by reducing resistive torque in the first and second articulating blankets 82, 102, by eliminating snag potential of the first and second articulating blankets 82, 102, and by eliminating incidence of deployment testing invalidation. Minimized thermal blanket resistance will not affect the torque resistance requirement. Preferably, the system 12 can match or beat torque resistance requirements for known thermal blanket and harness assemblies and systems surrounding similar or equivalent articulating devices. The system 12 and method 300 include a lightweight support frame assembly 50 with rigid first and second articulating blankets 82, 102 that provide clearance to the articulating actuator assembly 30 and the harness assembly 160, and the system 12 is designed for accessibility and repeatability. The 0.50 inch clearances required pursuant to command media requirements for moving interfaces are met. Accessibility after final deployment (stowed position) can occur without invalidation of prior deployment tests.

In addition, the system 12 and method 300 do not require "massaging" or manipulating of the thermal blanket assembly 80 in order to get it to fit in the vehicle 10 and do not require extensive thermal blanket installation experience by technicians or installers. The system 12 integrates lightweight, preferably aluminum, support frame assembly 50, first and second articulating blankets 82, 102, and the harness assembly 160 around the articulating actuating assembly 30 to ensure consistent clearance by the thermal blanket assembly 80. The system 12 and method 300 can be installed in the vehicle 10 as a single system with minimal or no rework or reinstallation required. Moreover, installation may be carried out when the system 12 is in a stowed position or a deployed position. The system 12 and method 300 can decrease space vehicle cycle time and therefore overall cost, can decrease labor hours such as for blanket technicians, deployment and liaison engineers, and associated installers, and can decrease material costs due to rework or reinstallation.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An integrated articulating thermal isolation system comprising:
    an articulating actuator assembly;
    a support frame assembly attached to and enclosing the articulating actuator assembly;
    a thermal blanket assembly attached to and substantially enclosing the support frame assembly and the articulating actuator assembly, the thermal blanket assembly comprising a pair of non-articulating blankets positioned on exterior surfaces of the support frame assembly and a pair of articulating blankets disposed between the non-articulating blankets, each articulating blanket having a plurality of stiffener elements;
    a harness assembly attached to the support frame assembly and positioned external to the articulating actuator assembly;
    a deployable assembly interface element attached to the support frame assembly; and,
    a vehicle interface element attached to the support frame assembly,
    wherein when the articulating actuator assembly is actuated, the articulating blankets are guided by the support frame assembly from a stowed position to a deployed position through motion of the articulating actuator assembly.

2. The system of claim 1, wherein the articulating actuator assembly comprises at least two separate articulated arm elements joined via a movable actuator.

3. The system of claim 1, wherein the support frame assembly comprises a first support frame attached to and overlapping with a second support frame.

4. The system of claim 1, wherein the harness assembly comprises a harness routing element, a guide element, and one or more attachment brackets.

5. The system of claim 4, wherein the harness assembly further comprises a harness thermal blanket that substantially covers the harness routing element.

6. The system of claim 1, wherein the plurality of stiffener elements comprises folded stiffener elements and flat stiffener elements.

7. The system of claim 1, wherein the deployable assembly interface element is attached to a deployable assembly comprising an antenna and an attached antenna boom.

8. The system of claim 1, wherein when the articulating blankets are guided by the support frame assembly from a stowed position to a deployed position, one articulating blanket unfolds as another articulating blanket folds.

9. The system of claim 1, wherein the system improves repeatability of installation and reliability during deployment by reducing resistive torque in the articulating blankets, by eliminating snag potential, and by eliminating incidence of deployment testing invalidation.

10. The system of claim 1, wherein the thermal blanket assembly provides repeatable clearance to the articulating actuator assembly and the harness assembly.

11. The system of claim 10, wherein the repeatable clearance is at least 0.50 inch.

12. The system of claim 1, wherein the non-articulating blankets are removable to provide access to the articulating actuator assembly without invalidating deployment testing.

13. An integrated articulating thermal isolation system for use with a space vehicle, the system comprising:
    an articulating actuator assembly comprising at least two separate articulated arm elements joined via a movable actuator;
    a support frame assembly attached to and enclosing the articulating actuator assembly, the support frame assembly comprising a first support frame attached to and overlapping with a second support frame;
    a thermal blanket assembly attached to and substantially enclosing the support frame assembly and the articulating actuator assembly, the thermal blanket assembly comprising a pair of non-articulating blankets positioned on exterior surfaces of the support frame assembly and a pair of articulating blankets disposed between the non-articulating blankets, each articulating blanket having a plurality of stiffener elements;
    a harness assembly attached to the support frame assembly and positioned external to the articulating actuator assembly, the harness assembly comprising a harness routing element, a guide element, and one or more attachment brackets;
    a deployable assembly interface element attached to the support frame assembly, and,
    a space vehicle interface element attached to the support frame assembly,
    wherein when the articulating actuator assembly is actuated, the articulating blankets are guided by the support frame assembly from a stowed position to a deployed position through motion of the movable actuator, and one articulating blanket unfolds as another articulating blanket folds.

14. The system of claim 13, wherein the system improves repeatability of installation and reliability during deployment by reducing resistive torque in the articulating blankets, by eliminating snag potential, and by eliminating incidence of deployment testing invalidation.

15. The system of claim 13 wherein the thermal blanket assembly provides repeatable clearance to the articulating actuator assembly and the harness assembly.

16. The system of claim 15, wherein the repeatable clearance is at least 0.50 inch.

17. A method for controlling thermal blanket and harness assemblies enclosing an articulating actuator assembly in a space vehicle, the method comprising:
providing an integrated articulating thermal isolation system comprising:
an articulating actuator assembly;
a support frame assembly attached to and enclosing the articulating actuator assembly;
a thermal blanket assembly attached to and substantially enclosing the support frame assembly and the articulating actuator assembly, the thermal blanket assembly comprising a pair of non-articulating blankets positioned on exterior surfaces of the support frame assembly and a pair of articulating blankets disposed between the non-articulating blankets, each articulating blanket having a plurality of stiffener elements;
a harness assembly attached to the support frame assembly and positioned external to the articulating actuator assembly;
a deployment assembly interface element attached to the support frame assembly, and,
a vehicle interface element attached to the support frame assembly;
installing the system in a space vehicle and attaching the system to a deployable assembly on the space vehicle; and,
actuating the articulating actuator assembly of the system so that the articulating blankets are guided by the support frame assembly from a stowed position to a deployed position through motion of the articulating actuator assembly, such that the thermal blanket assembly provides repeatable clearance to the articulating actuator assembly and the harness assembly.

18. The method of claim 17, wherein when the articulating blankets are guided by the support frame assembly from a stowed position to a deployed position, one articulating blanket unfolds as another articulating blanket folds.

19. The method of claim 17, wherein the non-articulating blankets are removable to provide access to the articulating actuator assembly without invalidating deployment testing.

20. The method of claim 17, wherein the repeatable clearance is at least 0.50 inch.

* * * * *